UNITED STATES PATENT OFFICE 2,127,039

HORTICULTURAL SPRAY OIL

Frank F. Lindstaedt, Oakland, Calif.

No Drawing. Application June 27, 1936,
Serial No. 87,737

8 Claims. (Cl. 167—28)

The invention relates to horticultural spray preparations and more particularly to hydrocarbon oil sprays and the inclusion therein of certain organic toxicants.

Of the various organic toxicants which have been used in horticultural spray preparations, one, a compound known as thiodiphenylamine, has been found very beneficial and effective in the control of certain parasites. However, this substance as procured heretofore, is insoluble both in hydrocarbon oil and water, and accordingly, when added to an oil and water spray emulsion, the same must be kept in agitation to prevent precipitation of the thiodiphenylamine. In accordance with the present invention and as a principal object thereof, I have developed a treatment for the thiodiphenylamine which will render the same soluble in hydrocarbon oil whereby the same may be added to the oil initially along with an oil soluble emulsion prior to shipment and use in the field where the oil is generally emulsified with water for spraying. Furthermore, as an added feature of the treatment of the present invention the thiodiphenylamine is left insoluble in water and consequently, the entire proportion of the toxicant remains in the oil phase when emulsified with water and sprayed, and continues with the oil on the plant structure after the emulsion has broken.

Another object of the present invention is to provide an oil soluble toxicant of the character described which, in addition to its parasitical action will effectively retard the penetration of the hydrocarbon oil into the vascular system of the plant and hold such oil directly at the surface of the plant tissues where the same may most effectively attack the parasites.

The invention possesses other objects which with the foregoing will be set forth in the following description of the preferred forms of the invention. It is to be understood, however, that I do not limit myself to said description, as I may adopt variations, from said form within the scope of the invention as set forth in the claims.

Briefly stated, I have found that by treating the thiodiphenylamine with certain fatty oils there may be obtained a reaction product which retains the toxic property of the thiodiphenylamine, but in contrast to this compound is soluble in the hydrocarbon or petroleum oil. Preferably this treatment is carried on in the presence of a mild heat at approximately 70° C. to 130° C., and from a few minutes to an hour or so, depending upon the particular fatty oils used, and under which condition the thiodiphenylamine is mixed with the fatty oil of a vegetable or animal base. Various of these oils have proven very satisfactory for the purpose of the present invention and amongst the outstanding are, soya bean kettled oil, boiled vacuum kettled sardine oil, varnish makers' hempseed oil, raw tung oil, and various blended bodied vegetable oils similar to those used as substitutes for linseed oil in the paint industry.

As a specific example, I may add approximately three-fourths of a pound of thiodiphenylamine to five pounds of varnish makers' hempseed oil and heat the mixture at approximately 90° C. for approximately 15 minutes, when the resulting clear solution may be added to approximately 95 pounds of mineral oil. The product resulting from this treatment is substantially clear and is completely soluble in the hydrocarbon oil in amounts desired for commercial use. This is also true of similar combinations of the thiodiphenylamine and the other fatty oils mentioned, and with the exception of the production of certain cloudiness and a greater amount of deposit, the thiodiphenylamine may be successfully reacted with a wide range of vegetable and animal oils to produce a petroleum oil soluble toxicant.

While the thiodiphenylamine fatty oil combination and the hydrocarbon oil may be successfully emulsified in water with substantially any recognized emulsifying agent for horticultural spray preparations, I have found that particularly good results have been obtained with the use of an emulsifying agent consisting of a combination of naphthenic acid and sulphonated acid. This specific emulsifier has been more fully described and claimed in my co-pending application, Serial Number 752,990 filed November 4, 1934. With this combination, approximately one-half to one and one-half per cent emulsifier is dissolved in the hydrocarbon oil together with three to five per cent of the intermediate fatty oil solvent and from one to two per cent of the thiodiphenylamine. These preparations, however, while indicated in their normally suggested use may be varied somewhat to control the toxicity and oil deposit of the preparation.

The fatty oil, in addition to functioning as an intermediate solvent for thiodiphenylamine and hydrocarbon oil, has the important effect in many instances, of retarding the penetration of the hydrocarbon oil into the plant system. This phenomenon is probably most reasonably explained as caused by an oxidation of the fatty oil when sprayed and on exposure to air and the thickening of the oil and the holding effect thereof on the hydrocarbon oil whereby the latter is retained at the surface of the plant where the same may directly attack the parasites. This is particularly true of those animal and vegetable oils which are classed as drying or semi-drying oils. The penetration control function of these fatty oils has been more fully set forth and claimed in my co-pending application, Serial Number 24,359, filed May 31st, 1935.

I claim:

1. A horticultural spray composition comprising, a hydrocarbon oil, and an oil soluble reaction product of an unsaturated fatty oil and thiodiphenylamine.

2. A horticultural spray composition comprising, a hydrocarbon oil, and an oil soluble reaction product of an unsaturated vegetable oil and thiodiphenylamine.

3. A horticultural spray composition comprising, a hydrocarbon oil, and an oil soluble reaction product of an unsaturated fish oil and thiodiphenylamine.

4. A petroleum oil soluble preparation comprising the reaction product of thiodiphenylamine and an unsaturated fatty oil.

5. A toxicant for a petroleum oil horticultural spray consisting of, the reaction product of thiodiphenylamine and an unsaturated fatty oil.

6. A horticultural spray composition comprising, a hydrocarbon oil, and an oil soluble reaction product of thiodiphenylamine and soya bean oil.

7. A horticultural spray composition comprising, a hydrocarbon oil, and an oil soluble reaction product of thiodiphenylamine and hempseed oil.

8. A horticultural spray composition comprising, a hydrocarbon oil, and an oil soluble reaction product of thiodiphenylamine and sardine oil.

FRANK F. LINDSTAEDT.